Patented Aug. 14, 1923.

1,464,984

UNITED STATES PATENT OFFICE.

ANTONIUS FOSS, OF CHRISTIANIA, AND THOR MEJDELL, OF SKOIEN, NEAR CHRISTIANIA, NORWAY, ASSIGNORS TO NORSK HYDRO-ELEKTRISK KVAELSTOF-AKTIESELSKAB, OF CHRISTIANIA, NORWAY.

PROCESS FOR PRODUCING AMMONIUM NITRATE AND ALUMINUM HYDROXIDE.

No Drawing.   Application filed February 27, 1922. Serial No. 539,741.

*To all whom it may concern:*

Be it known that we, ANTONIUS FOSS and THOR MEJDELL, citizens of the Kingdom of Norway, residing at Jacob Aalsgate 30, Christiania, and Skoien, near Christiania, in Norway, have invented certain new and useful Improvements in Processes for Producing Ammonium Nitrate and Aluminum Hydroxide, of which the following is a specification.

In producing aluminum compositions from minerals or rock, nitric acid is often used for dissolving the metals in the rock. If the nitrate of aluminum is not to be manufactured the aluminum oxide will have to be extracted, for instance, by precipitating with ammonia. When using this process, however, comparatively large quantities of nitric acid that turns into nitrates are consumed, so the manufacture of aluminum oxide is closely connected with an equivalent manufacture of various nitrates, and consequently depends on the market for these goods. Besides this, nitrate of ammonia mixed with alkaline and alkaline earth nitrates originating from the raw material will be obtained, and it will be in a diluted hydrous solution that will have to be evaporated.

The present inventors have now made several alterations in the process in order to avoid these disadvantages.

According to the improved method the minerals are dissolved in nitric acid, the iron is removed and it is boiled so hard that not only the superfluous nitric acid is eliminated, but so much, that basic nitrate of alumina is produced. This will then be precipitated in a state easy to filter, while the nitric acid that has been evaporated can be used again for decomposing new raw material and the mother liquid from the basic nitrate will contain alkaline nitrates and alkaline earth nitrates.

The basic nitrate of alumina is then treated with ammonia in the same way in which aluminum salts are usually treated. This produces hydroxide of alumina in a state that is easy to filter. By combining this method with the precipitation of basic nitrate as described above, a special advantage is obtained in that the resulting salt of ammonia is the nitrate, is a salt which together with ammonia forms a liquid, the so-called "Divers" liquid. Even if there should happen to be any water, a similar liquid is obtained. When the superfluous ammonia is removed from the liquid, nitrate of ammonia will be obtained without it being necessary to evaporate large quantities of water.

We claim:

A process for producing ammonium nitrate and hydroxide of aluminum from solutions containing aluminum nitrate, which consists in precipitating from the nitrate solution a basic aluminum nitrate, treating the latter with ammonia and filtering the hydroxide of aluminum thus precipitated.

In testimony whereof, we affix our signatures.

ANTONIUS FOSS.
THOR MEJDELL.